United States Patent [19]

Yamamoto et al.

[11] Patent Number: 4,855,365

[45] Date of Patent: Aug. 8, 1989

[54] POLY-β-ALANINE COMPOUND, A PROCESS FOR PRODUCING THE SAME AND A POLYACETAL RESIN COMPOSITION CONTAINING A POLY-β-ALANINE COMPOUND

[75] Inventors: Fumihiko Yamamoto, Kawasaki; Teruyuki Misumi, Yokohama, both of Japan

[73] Assignee: Asahi Kasei Kogyo Kabushiki Kaisha, Osaka, Japan

[21] Appl. No.: 47,311

[22] Filed: May 8, 1987

[30] Foreign Application Priority Data

May 9, 1986 [JP] Japan ................................ 61-105889
May 9, 1986 [JP] Japan ................................ 61-105890

[51] Int. Cl.$^4$ ................................ C08G 69/00
[52] U.S. Cl. ........................ 525/401; 525/398; 525/402; 525/427; 525/472; 526/192; 526/210; 526/212; 528/310; 528/328; 528/332
[58] Field of Search .............. 525/401, 402, 472, 398, 525/427; 528/310, 332, 328

[56] References Cited

U.S. PATENT DOCUMENTS 4,536,566  8/1985  Coffey ................................ 528/310
4,628,077 12/1986  Desmond et al. ................... 528/310

FOREIGN PATENT DOCUMENTS 0098356  6/1983  Japan ................................ 525/401

OTHER PUBLICATIONS

David S. Breslow et al., "Synthesis of Poly-β-Alanine from Acrylamide. A Novel Synthesis of β-Alanine", J. Am. Chem. Soc., 79, 3760 (1957).

J. P. Kennedy & T. Otsu, J. Macrom. Sci. Rev. Macrom. Chem. 6 (1972), "Hydrogen Transfer Polymerization with Anionic Catalysts and the Problem of Anionic Isomerization Polymerization", pp. 237–283.

Naoya Ogata, "The Transition Polymerization of Acrylamide I. On the Polymerization Condition and the Property of Polymer", Soc. Japan, 33, 906 (1960).

Primary Examiner—Harold D. Anderson
Attorney, Agent, or Firm—Birch, Stewart, Kolasch & Birch

[57] ABSTRACT

There is disclosed a novel poly-β-alanine compound comprising monomeric units of the formula $(CH_2CH_2CONH)$ and monomeric units of the formula

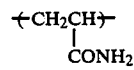

in a specific proportion, having a high degree of polymerization and which is essentially free from metal contamination. The novel poly-β-alanine is produced by polymerizing acrylamide using an alkaline earth metal alcoholate catalyst in an extremely limited amount. The novel compound has a wide variety of uses, and is especially useful as a thermal stabilizer for a polyacetal resin.

4 Claims, 5 Drawing Sheets

POLY-β-ALANINE COMPOUND, A PROCESS FOR PRODUCING THE SAME AND A POLYACETAL RESIN COMPOSITION CONTAINING A POLY-β-ALANINE COMPOUND

BACKGROUND OF THE INVENTION

1. Field of the Invention

The present invention relates to a poly-β-alanine compound and a process for the production thereof. The present invention also relates to a polyacetal resin composition containing a poly-β-alanine compound. More particularly, the present invention is concerned with a novel poly-β-alanine compound and a process for producing the same. The novel poly-β-alanine compound is characterized by having a high degree of polymerization such that it is insoluble in formic acid or that even though it is soluble in formic acid, it has a high reduced viscosity and is characterized by comprising monomeric units of the formula $\mathrm{\{CH_2CH_2CONH\}}$ and monomeric units of the formula

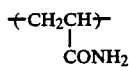

in a specific proportion. The process for producing the novel poly-β-alanine compound is characterized by using a catalyst in an extremely limited amount. The novel poly-β-alanine compound of the present invention has a wide variety of uses and is especially useful as an additive to be mixed with polymers, as a material for forming shaped articles such as films and sheets, as a paint, a coating material, an adhesive, a printing ink, a paper coating material, a soil conditioner, a textile auxiliary or the like. The present invention is also concerned with a polyacetal resin composition having a poly-β-alanine compound incorporated therein, which composition is excellent in thermal stability and is free from heat discoloration.

Discussion of Related Art

In 1957, it was reported for the first time by Breslow et al. that acrylamide was polymerized to poly-β-alanine through the transition of an amide hydrogen to a double bond of acrylamide [D. S. Breslow, G. E. Hulse and A. S. Matlack, J. Am. Chem. Soc., 79, 3760 (1957)]. Since then, a number of reports have been published in regard to this method.

In general, the above-mentioned polymerization of acrylamide through the transition of an amide hydrogen to a double bond of acrylamide (hereinafter often called "the transition polymerization") is carried out by dissolving acrylamide in a solvent such as toluene, xylene, chlorobenzene or pyridine and heating the resulting solution at 80° to 140° C. in the presence of 1/10 to 1/100 mole, per mole of the acrylamide, of an alcoholate of an alkali metal as a catalyst and N-phenyl-β-naphthylamine or the like as a radical polymerization inhibitor.

However, the polymer obtained by the abovementioned method contains not only polymerized units typically formed by transition polymerization but also those formed by vinyl polymerization of acrylamide [S. Okamura, T. Higashimura and T. Seno-o, Kobunshikagaku, 20, 364 (1963)]. That is, when the transition polymerization of acrylamide is carried out, there is usually obtained a copolymer consisting of monomeric units formed by transition polymerization and represented by the formula $\mathrm{\{CH_2CH_2COHN\}}$ and monomeric units formed by vinyl polymerization and represented by the formula

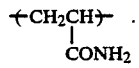

The proportion of the units formed by transition polymerization to the units formed by vinyl polymerization varies according to the type and amount of catalyst used, the polymerization conditions employed and the like. For instance, it is known that as the amount of the catalyst present relative to the amount of acrylamide becomes small, the proportion of the units formed by transition polymerization tends to become small and the proportion of the units formed by vinyl polymerization tends to become large.

Further, it is known that when the amount of the catalyst is 1/100 mole or less per mole of acrylamide, the progress of polymerization reaction is suppressed and hence the yield of polymer decreases. For example, it is reported that when the polymerization of acrylamide is conducted using 1/200 mole, per mole of the acrylamide, of sodium butoxide as a catalyst, the yield of polymer is as low as 0 to 5 % [N. Ogata, Bull. Chem. Soc. Japan, 33, 906 (1960)].

On the other hand, Japanese Patent Application Publication No. 38-26791 discloses a method of producing poly-β-alanine in which acrylamide is subjected to polymerization in an organic solvent using about 1/30 mole, per mole of the acrylamide, of calcium ethylate as a catalyst. The polymer obtained by this method has a reduced viscosity as low as 1.0 or less, i.e. has a low degree of polymerization. This is disadvantageous because of polymer having a low degree of polymerization is poor in mechanical strength. Hence, such a polymer cannot easily be molded into a fiber, a film or a sheet. This method is also disadvantageous in that because the amount of catalyst needed is as large as 1/30 mole per mole of acrylamide, the resulting polymer tends to be contaminated with catalyst residue. In general, when a catalyst is used in an amount of 1/10 to 1/100 mole per mole of the monomeric acrylamide in preparing the poly-β-alanine product, the resulting polymer is caused to contain a large amount of the alkali metal or alkaline earth metal catalysts residue. These metals become bonded to or form a coordinate bond with the polymer during the preparation of the polymer product and, thereof, such bonded metals cannot be removed by a usual washing operation. Even by a special treatment such as an ion exchange treatment, it is still difficult to remove these bonded metals completely.

The present inventors previously proposed a method of producing poly-β-alanine by the transition polymerization of acrylamide using as the catalyst a calcium alcoholate having 3 or more carbon atoms (see Japanese Patent Application Laid-Open Specification No. 59-213722). By this method, poly-β-alanine having a relatively high degree of polymerization can be obtained. In this method, however, the amount of the calcium alcoholate catalyst needed is still large, i.e. at least 0.02 mole per mole of acrylamide and, hence, the resulting polymer is still insufficient in the desired properties due possibly to the small proportion of the monomeric units of the formula

contained in the polymer and, in addition, the method is not free from the above-mentioned problem of the resulting polymer becoming contaminated with the alkaline earth metal (calcium) catalyst residue.

Incidentally, a composition comprising a polyacetal resin and additives such as an antioxidant, a light stabilizer and a lubricant, is widely used as a material which is suitable for molding or the like. A polyacetal resin is obtained by the polymerization of formaldehyde or a cyclic oligomer thereof, such as a trioxane or tetraoxane, or by the copolymerization of formaldehyde or a cyclic oligomer thereof with a monomer copolymerizable therewith. It is customary to subject of the terminal groups of the thus obtained polymer to various treatments, such as etherification and esterification, in order to prevent the polymer from depolymerization which often occurs at the terminal groups of this type of polymer. Further, in addition to the treatment of the terminal groups of the polymer, it is necessary in preparing a polyacetal resin, to incorporate into the polyacetal resin a thermal stabilizer for the purpose of maintaining and improving the property of the resin. Various proposals have been made with respect to a thermal stabilizer to be used in combination with a polyacetal resin. For example, it has been proposed to use urea or a derivative thereof, hydrazine or a derivative thereof, an amide, a polyamide, or various other compounds as the thermal stabilizer, which is used alone or in combination with an antioxidant and/or an ultraviolet light absorber. However, the improvement in thermal stability attained by the proposed thermal stabilizers is small. In addition, when a polyacetal resin is subjected to molding, some of the proposed thermal stabilizers having a low molecular weight tend to escape from the resin by evaporation or by bleeding out after molding and, as a result, the capability of such stabilizers to improve the thermal stability of the resin is lowered or does not last. Therefore, a thermal stabilizer for a polyacetal resins, which is suitable from a practical point of view, has long been desired in the art.

Japanese Patent Application Publication No. 34-5440 discloses that a copolyamide obtained by copolymerizing 35% by weight of hexamethylene adipamide, 27% by weight of hexamethylene sebacoamide and 38% by weight of caprolactam is useful for improving the thermal stability of a polyacetal resin for a prolonged period of time. Therefore, this copolyamide may be used as a practical thermal stabilizer for a polyacetal resin. However, such as copolyamide is disadvantageous in that it undergoes discoloration by the action of heat or oxygen and, therefore, when it is blended with a polyacetal resin and the resulting blend is subjected to molding, it causes the molded product to become discolored, which leads to a lowering of the quality of the product formed. As an illustration, in the production of shaped articles from a synthetic resin by molding, regeneration-molding is generally carried out in order to increase the efficiency of the molding. For example, excess materials such as runners, formed in the process of injection molding, defective moldings and broken articles, are generally subjected to regeneration-molding. It is desirable that the quality of the resin remain unchanged before and after regeneration-molding. However, when regeneration-molding is conducted with respect to a polyacetal resin composition having incorporated therein a copolyamide obtained by condensation polymerization, the regeneration-molding not only results in the molded product becoming markedly discolored, but also, as observed, results in a change of color of the molded product with the lapse of time. Further, when a polyacetal resin composition, having incorporated therein various additives, such as a pigment, carbon black and a lubricant in addition to a copolyamide obtained by condensation polymerization, is subjected to molding, the thermal stability of the resultant molded product tends to be markedly low as compared with the case where a polyacetal resin composition having only a copolyamide incorporated therein is subjected to molding. From the viewpoint of maintaining the quality of polyacetal resin products, it is extremely important to improve the thermal stability of a polyacetal resin having incorporated therein a thermal stabilizer and various other additives in combination.

Japanese Patent Application Laid-Open Specification No. 53-78255 discloses the use, as a thermal stabilizer for a polyacetal resin, of a mixture of a polyamide and a carrier resin prepared by dispersing a polyhexamethylene adipamide in an ethylene-methyl acrylate copolymer. The incorporation of the mixture into a polyacetal resin is effective for preventing a deposit product during the molding of the resin from adhesion onto the mold or die, but causes discoloration of the resin in the process of molding and is not effective for imparting the thermal stability to the polyacetal resin in the case where the resin contains the thermal stabilizer and other additives in combination.

Further, the present inventors previously proposed a polyacetal resin composition having incorporated therein the poly-$\beta$-alanine disclosed in the above-mentioned Japanese Patent Application Laid-Open Specification No. 59-213722 (see Japanese Patent Application Laid-Open Specification No. 59-213752). However, this polyacetal resin composition is till insufficient with respect to the thermal stability and freedom from heat discoloration.

SUMMARY OF THE INVENTION

With a view toward developing a novel poly-$\beta$-alanine compound free from the above-mentioned drawbacks inevitably accompanying the conventional similar compounds, and a method of producing such a poly-$\beta$-alanine compound efficiently, the present inventors have conducted extensive and intensive studies. As a result, it has unexpectedly been found that a novel poly-$\beta$-alanine compound having a high degree of polymerization and which is essentially free from metal contamination, can be produced by polymerizing acrylamide using an alcoholate of an alkaline earth metal as a catalyst, in an amount which is extremely small as compared with the amount of the catalyst used in the conventional methods. It has also unexpectedly been found that when the novel poly-$\beta$-alanine compound is incorporated into a polyacetal resin, the resulting polyacetal resin composition is imparted with an improved thermal stability, even if the composition contains additives, such as a pigment and carbon black, the composition does not discolor, even if subjected to heat conditions and, at the same time, a deposit produced during the molding of the polyacetal resin composition is prevented from being adhered to the mold or die.

Accordingly, it is an object of the present invention to provide a novel poly-β-alanine compound having a high degree of polymerization and which is essentially free from metal contamination.

It is another object of the present invention to provide a method of producing the novel poly-β-alanine compound.

It is yet another object of the present invention to provide a method of producing the novel poly-β-alanine compoud, in which an alkaline earth metal alcoholate catalyst is used in an extremely small amount.

It is a further object of the present invention to provide a polyacetal resin composition containing a poly-β-alanine compound, which is greatly improved with respect to thermal stability and freedom from heat discoloration.

The foregoing and other objects, features and advantages of the present invention will be apparent from the following detailed description and appended claims taken in connection with the accompanying drawings.

DETAILED DESCRIPTION

In one aspect of the present invention, there is provided a poly-β-alanine compound comprising:

(X) monomeric units represented by the formula
(Y) monomeric units represented by the formula

the content of said units (Y) being in the range of 1.4 to 10 mmol per gram of the compound, wherein said compound is soluble in formic acid and has a reduced viscosity ($\eta sp/C$) of 2 to 15 dl/g as measured at 35° C. with respect to 1% (w/v) solution of the compound in formic acid.

In another aspect of the present invention, there is provided a poly-β-alanine compound comprising:

(X) monomeric units represented by the formula
$+CH_2CH_2CONH+$ and
(Y) monomeric units represented by the formula

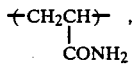

the content of said units (Y) being in the range of 1.4 to 10 mmol per gram of the compound, wherein said compound is insoluble in formic acid.

The poly-β-alanine compound according to the present invention which is soluble in formic acid is hereinafter often referred to as "poly-β-alanine compound (I)" and the poly-β-alanine compound according to the present invention which is insoluble in formic acid is hereinafter often referred to as "poly-β-alanine compound (II)".

Figure 1:
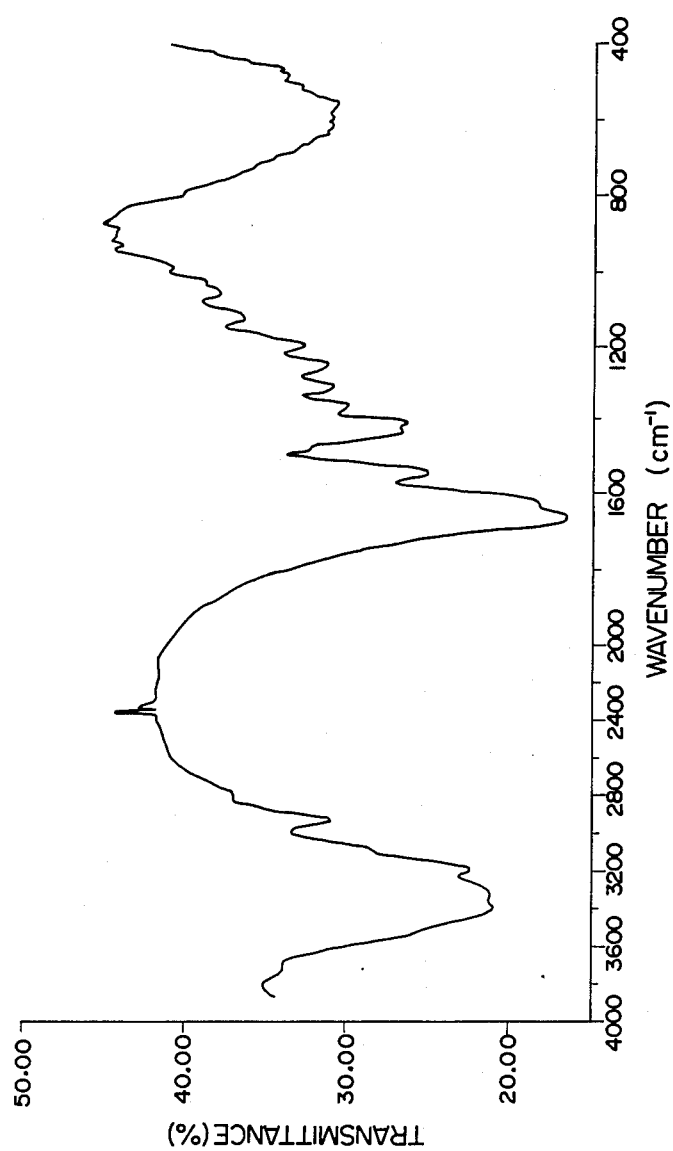
FIG. 1 is an infrared absorption spectrum of one class of poly-β-alanine compound of the present invention which is soluble in formic acid.
Figure 3:
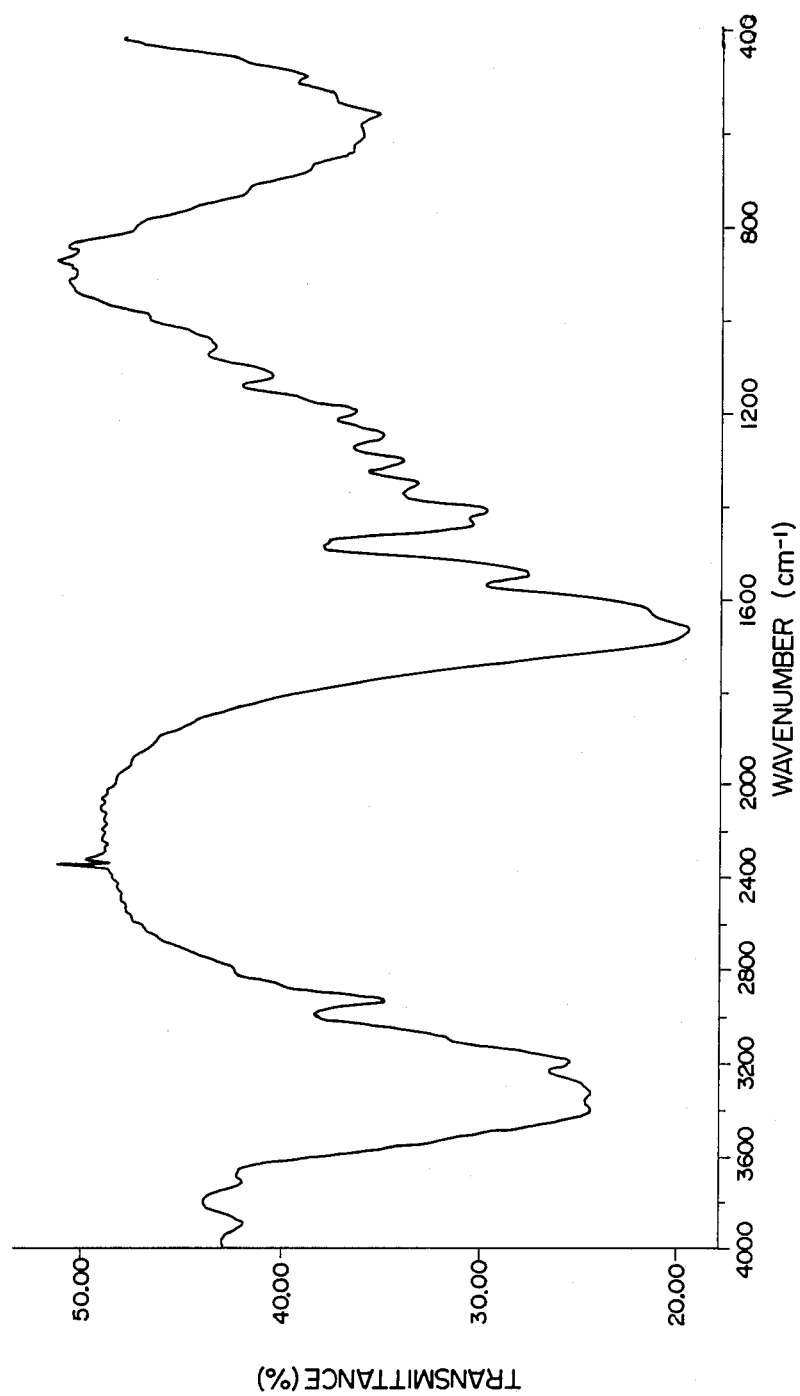
FIG. 3 is an infrared absorption spectrum of another class of poly-β-alanine compound of the present invention, which is insoluble in formic acid.
Figure 4:
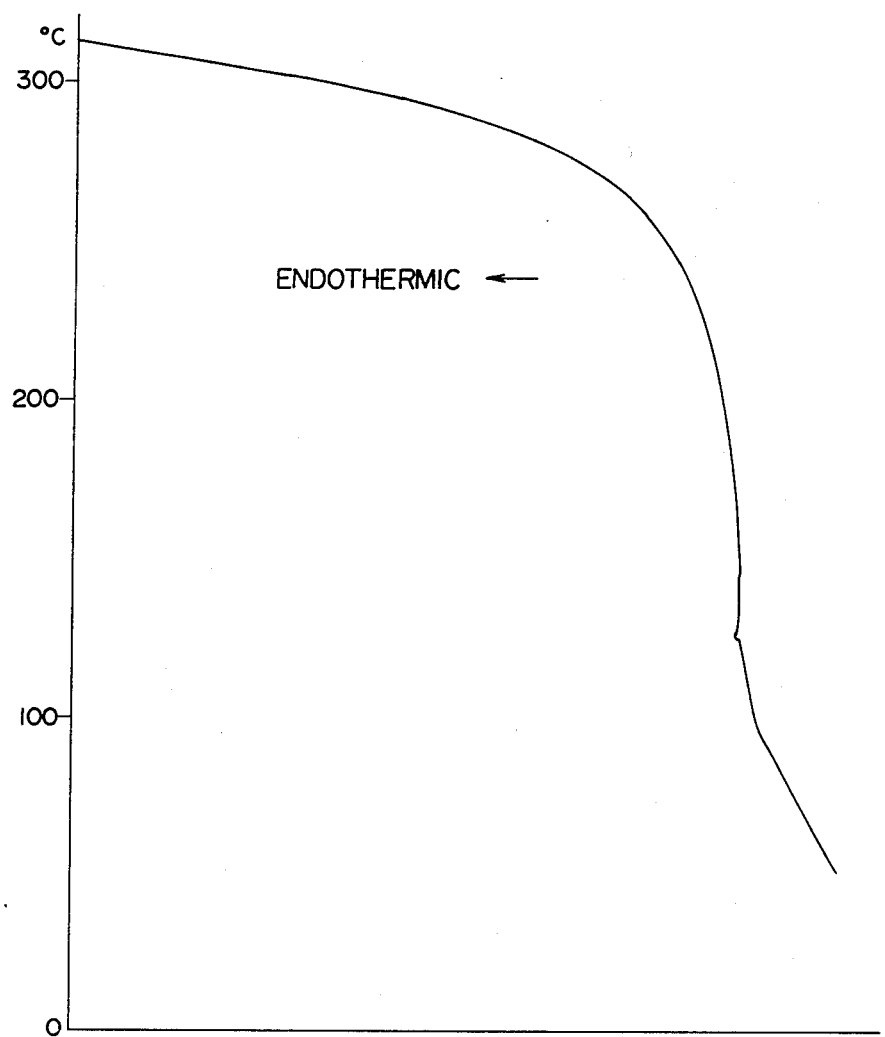
FIG. 4 shows a thermogram obtained by subjecting to a differential scanning calorimetry the poly-β-alanine compound of the present invention which is soluble in formic acid.
Figure 5:
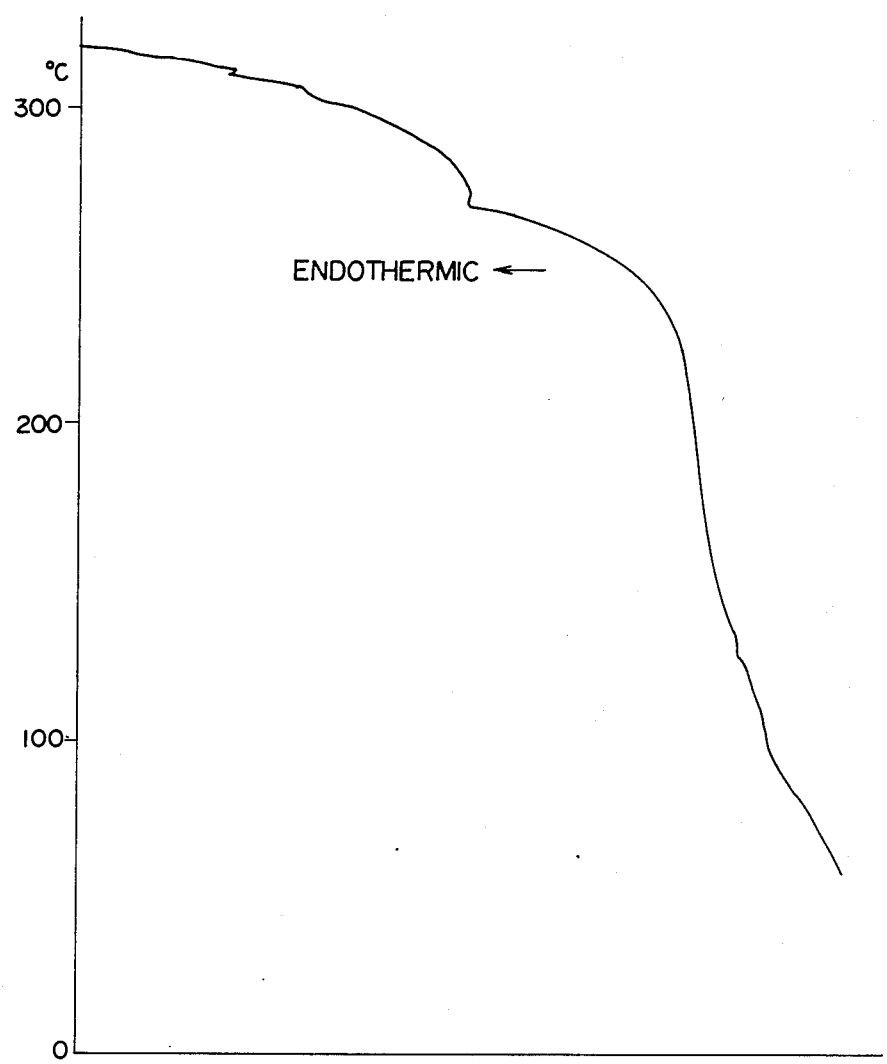
FIG. 5 shows a thermogram obtained by subjecting to a differential scanning calorimetry the poly-β-alanine compound of the present invention which is insoluble in formic acid.

The chemical structures of the poly-β-alanine compounds according to the present invention can be identified by measuring their IR absorption spectra and by differential scanning calorimetry. Referring to FIGS. 1 and 3 showing the IR spectra of the poly-β-alanine compounds of the present invention, there are observed absorption peaks at wave numbers of 3290 cm$^{-1}$, 1638 cm$^{-1}$, 1535 cm$^{-1}$, 1108 cm$^{-1}$ and 972 cm$^{-1}$, which are ascribed to a secondary amide group (—CONH—), and absorption peaks at wave numbers of 3355 cm$^{-1}$, 3190 cm$^{-1}$, 1658 cm$^{-1}$ and 1617 cm$^{-1}$, which are ascribed to a primary amide group (—CONH$_2$). This confirms the presence of the units (X) and the units (Y) in the poly-β-alanine compounds. Further, the results of the differential scanning caliorimetry (DSC) measurements of the poly-β-alanine compounds of the present invention are shown in FIGS. 4 and 5. Comparison between the DSC data of the present poly-β-alanine compounds and the data of the conventional poly-β-alanine and polyacrylamide is made and the results are shown in Table 1.

TABLE 1

| Polymer | Endothermic |
| --- | --- |
| Poly-β-alanine compound of the present invention | 320 to 330° C. |
| Poly-β-alanine | 340 to 350° C. |
| Polyacrylamide | 180 to 190° C. and 280 to 290° C. |

The above results clearly show that the poly-β-analine compounds according to the present invention are not a simple mixture of poly-β-alanine and polyacrylamide but a new polymer comprising the units (X) of the formula $+CH_2CH_2CONH+$ and the units (Y) of the formula

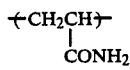

Figure 2:
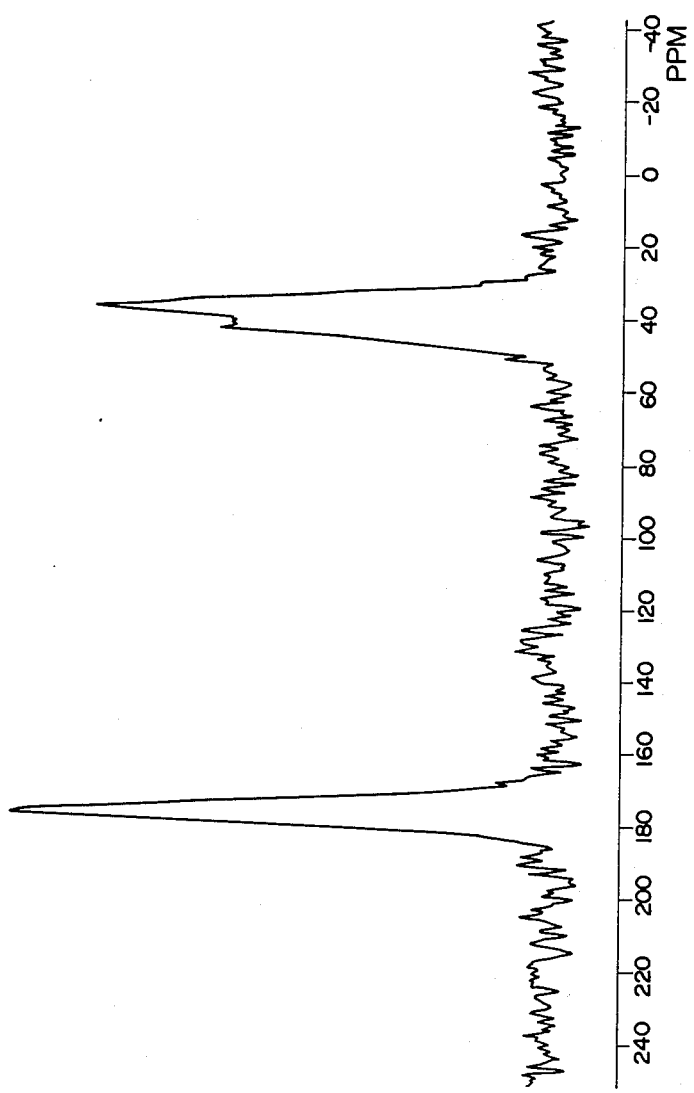
FIG. 2 is a nuclear magnetic resonance spectrum of the poly-β-analine compound mentioned above.

Referring to FIG. 2, there is shown an NMR spectrum of the poly-β-alanine compound of the present invention. From the NMR spectrum and the abovementioned IR spectrum, it is apparent that the present poly-β-alanine compound is a polymer comprised, in a random sequence, of the units (X) of the formula $+CH_2CH_2CONH+$ and the units (Y) of the formula

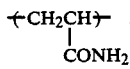

In the poly-β-alanine compounds (I) and (II) according to the present invention, the content of the units (Y) is in the range of 1.4 to 10 mmole, preferably 1.4 to 9.0 mmole, more preferably 5.0 to 9.0 mmole per gram of the compound. The content of the units (Y) can be determined by the method which will be mentioned later.

The poly-β-analine compounds according to the present invention are single compounds containing, in their molecules, both the units (X) and the units (Y), namely poly (X+Y). The poly-β-alanine compounds of the present invention exhibit the excellent effects which will be mentioned later. Such excellent effects cannot be obtained by simply blending poly-β-alanine (corresponding to poly-X) with polyacrylamide (corresponding to poly-Y).

As mentioned above, the poly-β-alanine compounds according to the present invention have a primary amide group in the units (Y) and a secondary amide group in the units (X). The units (X) has one secondary amide group per three carbon atoms. This means that the density of groups capable of forming a hydrogen bond (secondary amide groups) is high. Therefore, the intermolecular bond in the compounds of the present invention is strong. Further, the units (Y) contained in the compounds of the present invention is hydrophilic and capable of forming a hydrogen bond.

As mentioned above, the poly-β-alanine compound of the present invention comprises, as its main units, the monomeric units (X) and the monomeric units (Y). In this connection, it is noted that depending on the polymerization conditions employed for the production of the poly-β-alanine compound, such as polymerization temperature and the like, the present poly-β-alanine compound may also contain units other than the monomeric units (X) and (Y), which are based on the paritcular structures of the units (X) and (Y). It should be noted, however, that it is essential for the poly-β-alanine compound of the present invention to contain the monomeric units (Y) in an amount of 1.4 to 10 mmol per gram of the compound.

The poly-β-alanine compound(I) according to the present invention, i.e. the poly-β-alanine compound which is soluble in formic acid has a reduced viscosity ($\eta$sp/C) of 2 to 15 dl/g as measured at 35° C. with respect to 1% (w/v) solution of the compound in formic acid. This indicates that the compound (I) has a high molecular weight. Further, the compound (I) is also soluble in water, and can be used as an aqueous solution. When the reduced viscosity is less than 2 dl/g, the compound is poor in mechanical properties and cohesiveness, which leads to difficulty in forming the compound into films or sheets, and the melting point of the compound becomes low. On the other hand, when the reduced viscosity is more than 15 dl/g, the solubility of the compound in water markedly decreases. In the present invention, the reduced viscosity is measured by the method as mentioned later.

The poly-β-alanine compound (II) according to the present invention, i.e. the poly-β-alanine compound which is insoluble in formic acid cannot be used as a solution in water. However, this compound is extremely useful, for example as a thermal stabilizer for a polyacetal resin and a water treatment resin. It is believed that the poly-β-alanine compound (II) has a molecular weight larger than the poly-β-alanine compound (I) and contains molecules which are crosslinked by imido bonds formed through bimolecular reactions between the primary amides of the molecules.

Due to the above-mentioned features, the poly-β-alanine compounds (I) and (II) according to the present invention have a number of applications. For example, the poly-β-alanine compounds of the present invention can be suitably used as an additive to polymers, a material for shaped articles such as films and sheets, a paint, an adhesive, a coating material, a printing ink, a paper coating material, a soil conditioner, a textile auxiliary, a coagulating agent, an adsorbent, an additive to concrete, an antistatic agent, an ion exchange resin and the like.

With respect to the use of the compounds of the present invention, some examples are given below.

As mentioned above, the poly-β-alanine compounds according to the present invention are especially excellent as a thermal stabilizer for a polyacetal resin. A detailed description of this use will be given later.

The poly-β-alanine compounds (I) and (II) of the present invention are also useful as a scavenger of formaldehyde which is generated in a small amount from a phenolic resin, a urea resin and a melamine resin which are produced using formaldehyde. For this purpose, the poly-β-alanine cmpound (I) and/or (II) may be incorporated in an amount of 0.1 to 1.0% into the above-mentioned resin. The incorporated of a compound (I) and/or (II) may be performed by dryblending a powdery poly-β-alanine compound (I) and/or (II) with the resin. With respect to a compound (I), the incorporation of it may also be performed by preparing 5 to 10% aqueous solution of the poly-β-alanine compound (I), adding the solution to the resin and evaporating the water content from the resultant mixture.

The poly-β-alanine compound (I) of the present invention may also be used as an adhesive for paper, aluminum foil, or the like. In this use, the poly-β-alanine compound (I) is dissolved in water and the resulting solution is coated on paper, aluminium foil or the like.

The poly-β-alanine compound (I) may also be used as a soil conditioner. For soil to be suitable for the growth of crops, the soil is required to have an appropriate balance of air permeability, water retention and drainage. Sand is good in air permeability and drainage but poor in water retention. Clay is good in a water retention but poor in air permeability and drainage. For soil to have a good balance of air permeability, water retention and drainage, it is preferred that the soil have an aggregated structure. It is known to use an aggregating agent of a high molecular weight polysaccharide or a phenolic compound in order to develop an aggregated structure in soil. However, the conventional aggregating agents have a drawback that by the use of these aggregating agents, development of the soil-aggregating effect takes a long period of time. For the purpose of eliminating this drawback, the use of nonionic aggregating agent such as a polyvinyl alcohol, anionic aggregating agent such as a polyacrylic acid or a cationic aggregating agent such as a polyethylene-imine has been proposed. However the aggregating agents comprised of these synthetic polymers have a poor soil aggregation effect, and the soil aggregation effect of such aggregating agents does not last for a sufficient period of time. By contrast, the poly-β-alanine compound (I) of the present invention exhibits an extremely strong adsorbability to soil to exert an excellent soil aggregation effect, and the soil aggregation effect of the compound persists for a prolonged period of time. Accordingly, by using the poly-β-alanine compound (I) of the present invention as a soil conditioner, it is possible to convert soil not suited for growth of crop plants to soil suited for growth of crop plants. In addition, the compound of the present invention is also useful for improving the drainage of athletic fields, baseball grounds, golf courses and the like, enabling any water troubles caused by a heavy rainfall to be presented. Usually, the poly-β-alanine compound (I) is dissolved in water to obtain a 1 to 10% aqueous solution and the solution may be spread over the soil in an amount of about 40 l for an area of 10 acres.

In a further aspect of the present invention, there is provided a process for producing a poly-β-alanine compound which comprises polymerizing acrylamide in the presence of 1/500 mole or less, per mole of the acrylamide, of an alcoholate of an alkaline earth metal to obtain a polymerization product, said polymerization product comprising:

20 to 100% by weight, based on the compounds (I) and (II), of a poly-β-alanine compound (I) comprising:
(X) monomeric units represented by the formula
(Y) monomeric units represented by the formula

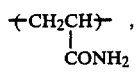

the content of said units (Y) being in the range of 1.4 to 10 mmol per gram of the compound, wherein said compound is soluble in formic acid and has a reduced viscosity ($\eta sp/C$) of 2 to 15 dl/g as measured at 35° C. with respect to 1% (w/v) solution of the compound in formic acid; and 0 to 80% by weight, based on the compounds (I) and (II), of a poly-β-alanine compound (II) comprising:
(X) monomeric units represented by the formula
(Y) monmeric units represented by the formula

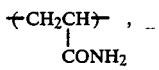

the content of said units (Y) being in the range of 1.4 to 10 mmol per gram of the compound, wherein said compound is insoluble in formic acid.

In the method of the present invention, it is requisite that an alcoholate of an alkaline earth metal as a catalyst be used in a specific limited amount. Examples of an alcoholate of an alkaline earth metal include calcium methylate, calcium ethylate, calcium propylate, strontium ethylate, barium ethylate, magnesium methylate and the like. In the present invention, the catalyst is used in an amount not greater than 1/500 mole, preferably 1/50,000 to 1/500 mole, more preferably 1/30,000 to 1/500 mole per mole of acrylamide. By polymerizing acrylamide using an alkaline earth metal alcoholate as a catalyst in an amount not greater than 1/500 mole per mole of the acrylamide, there can be obtained a poly-β-alanine compound comprising units (X) of the formula ${CH_2CH_2CONH}$ and units (Y) of the formula

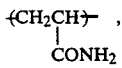

in which the units (Y) are present in an amount of 1.4 to 10 mmol per gram of the compound. Further, if the amount of the catalyst used is more than 1/500 mole per mole of acrylamide, the resultant polymer contains an increased amount of the metal derived from the catalyst in the form of an organic metal compound. The polymer containing the organic metal compound is disadvantageous because when the polymer is added to a polyacetal resin as a thermal stabilizer, the thermal stability of the resultant polyacetal resin composition is not improved, and the polyacetal resin composition tends to discolor in the process of molding thereof. On the other hand, when the amount of the catalyst used is less than 1/50,000 mole per mole of acrylamide, the progress of polymerization reaction is suppressed, leading to a decrease in the yield of polymer, and the content of the units (Y) in the poly-β-alanine compound obtained is increased too much. Furthermore, it is preferred that the catalyst be stored in a nitrogen atmosphere because the catalyst is deteriorated by the action of water, oxygen, etc.

The polymerization reaction may be comducted by solution polymerization such as batch solution polymerization or continuous solution polymerization, or bulk polymerization such as batch bulk polymerization or continuous bulk polymerization.

When the polymerization reaction is conducted by solution polymerization, there may be employed a solvent which dissolves acrylamide well and does not contaminate the catalyst used. As such a solvent, there may be mentioned, for example, an aromatic hydrocarbon such as xylene and toluene, a chlorinated aromatic hydrocarbon such as o-dichlorobenzene and the like.

The suitable polymerization temperature may vary according to the molar ratio of the catalyst to the acrylamide, whether polymerization is conducted by solution polymerization or bulk polymerization, the concentration of acrylamide in the solvent in the case of solution polymerization, etc. However, in general, the polymerization temperature may be in the range of 70° to 150° C., preferably 80° to 130° C. If the polymerization temperature is less than 70° C., the rate of polymerization is too low and not desirable from a practical point of view. Further, in the case where the polymerization reaction is conducted by bulk polymerization, the polymerization temperature may preferably be higher than the melting point of acrylamide. The bulk polymerization may usually be conducted at about 90° C. to about 140° C..

The suitable period of time for the polymerization may vary depending on the polymerization temperature. However, in general, the polymerization is effected for about 10 minutes to about 24 hours.

In order to prevent deterioration of the catalyst during the polymerization reaction, it is preferred that the water contents of acrylamide and any solvent to be used be controlled at 1000 ppm or less and at 50 ppm or less, respectively, and that oxygen be removed from acrylamide and any solvent prior to polymerization.

The removal of water from a solvent may be performed by treatment with a dehydrating agent or by azeotropic dehydration distillation. For example, the removal of water from acrylamide may be performed by treatment with dehydrated air at 50° to 60° C. for 10 to 24 hours or by treatment in vacuo (40 to 100 Torr) at 40° to 60° C. for 5 to 10 hours. The removal of oxygen from acrylamide and a solvent may, for example, be performed by treatment in vacuo (40 to 100 Torr) at 40 to 60° C. for 2 to 10 hours or by employing a nitrogen replacement method which is conducted at 40° to 60° C. for 4 to 6 hours. Further, it is to be noted that the use of a radical polymerization inhibitor such as napththylamine as proposed in the conventional method for producing poly-β-alanine should be avoided in the method of the present invention, because any impurities such as the inhibitor not only deteriorate the catalyst but also the product formed by the reaction between the catalyst and the impurities such as the inhibitor prevents formation of the desired poly-β-alanine compound.

As mentioned above, the use of an alkaline earth metal alcoholate as a catalyst in an amount not greater than 1/500 mole per mole of the acrylamide is critical to the method of the present invention. In general, as the molar ratio of the amount of the catalyst to the amount of acrylamide decreases, the content of the units (Y) in the compound increases. On the other hand, as the molar ratio of the amount of the catalyst to the amount of acrylamide increases, the content of the units (Y) in the compound decreases. In order to obtain the desired poly-$\beta$-alanine compound in which the content of the units (Y) is in the range of 1.4 to 10 mmole per gram of the compound, the molar ratio of the amount of the catalyst to the amount of acrylamide should be 1/500 or less, usually 1/50,000 to 1/500. It is also noted that the presence of impurities in the reaction system adversely affects formation of the desired poly-$\beta$-alanine compound. Therefore, it is preferred that any impurities be eliminated from the reaction system as much as possible.

By polymerizing acrylamide in accordance with the method of the present invention, there is obtained a reaction mixture containing a polymerization product.

The polymerization product is either a poly-$\beta$-alanine compound (I) or a mixture of a poly-$\beta$-alanine compound (I) and a poly-$\beta$-alanine compound (II) depending on the polymerization temperature. This is so because when the polymerization temperature is lower than a certain temperature, only a poly-$\beta$-alanine compound (I) is formed as a result of polymerization, but when the polymerization temperature is a certain temperature or higher, a poly-$\beta$-alanine compound (II) is formed together with a poly-$\beta$-alanine compound (I). The temperature at which the poly-$\beta$-alanine compound (II) begins to be formed varies depending on the amount ratio of the alcoholate of an alkaline earth metal to the acrylamide. However, in general, when the polymerization temperature is higher than about 95° C. and up to about 140° C. the poly-$\beta$-alanine compound (II) is formed, and as the polymerization temperature becomes higher in this temperature range, the proportion of the poly-$\beta$-alanine compound (II) in the polymerization product increases. For example, the polyerization product obtained by solution polymerization usually contains the poly-$\beta$-alanine compound (II) in an amount of 0% when the polymerization temperature is about 90° C. and about 1% by weight when the polymerization temperature is about 120° C. On the other hand, the polymerization product obtained by, for example, carrying out bulk polymerization using 1/10000 mole of an alcoholate of an alkaline earth metal per mole of acrylamide with stepwise heating at 100° C. for 1.5 hour, at 110° C. for 1.5 hour, at 120° C. for 1.5 hour and then at 140° C. for 1.5 hour contains about 3 to 10% by weight of the poly-$\beta$-alanine compound (II).

In the case where the polymerization product consists of the poly-$\beta$-alanine compound (I) only, the poly-$\beta$-alanine compound (I) can be obtained by isolating the polymerization product, i.e. the poly-$\beta$-alanine compound (I), from the reaction mixture. On the other hand, in the case where the polymerization product consists of a mixture of the poly-$\beta$-alanine compounds (I) and (II), the poly-$\beta$-alanine compound (I) can be obtained by separating the polymerization product from the reaction mixture and further isolating the poly-$\beta$-alanine compound (I) from the polymerization product. Further, the poly-$\beta$-alanine compound (II) can be obtained by isolating the poly-$\beta$-alanine compound (II) from a polymerization product consisting of a mixture of the poly-$\beta$-alanine compounds (I) and (II).

Moreover, the poly-$\beta$-alanine compound (II) may also be obtained by heating the reaction mixture at about 140° C. to about 180° C. to increase the amount of a poly-$\beta$-alanine compound (II), isolating the polymerization product from the heated reaction mixture and further isolating the poly-$\beta$-alanine compound (II) from the polymerization product.

Further, the poly-$\beta$-alanine compound (II) may also be obtained by heating the poly-$\beta$-alanine compound (I) at about 140° C. to about 180° C. to convert part of th poly-$\beta$-alanine compound (I) to the poly-$\beta$-alanine compound (II) and separating the poly-$\beta$-alanine compound (II) from the poly-$\beta$-alanine compound (I).

When the reaction mixture or the poly-$\beta$-alanine compoud (I) is heated at a temperature higher than 180° C., the resulting poly-$\beta$-alanine compound (I) and (II) disadvantageously tend to be discolored and/or decomposed. The above-mentioned heating of the reaction mixture or the poly-$\beta$-alanine compound (I) may be carried out for about 0.5 hours to about 24 hours. By the above-mentioned heating, the proportion of the poly-$\beta$-alanine compound (II) based on the poly-$\beta$-alanine compounds (I) and (II) is increased up to 80% by weight.

The isolation of a polymerization product from a reaction mixture may be conducted as follows. When the polymerization is conducted by solution polymerization, the reaction mixture contains a polymerization product, an unreacted acrylamide and a solvent and, therefore, the polymerization product may be isolated by subjecting the reaction mixture to filtration, thereby to remove the solvent, and then washing the residue with a suitable solvent for acrylamide to remove the unreacted acrylamide. When the polymerization is conducted by bulk polymerization, the reaction mixture contains a polymerization product and an unreacted acrylamide and, therefore, the polymerization product may be isolated by washing the reaction mixture with a suitable solvent for acrylamide to remove the unreacted acrylamide. As the suitable solvent for acryamide, there may be mentioned acetone or the like.

Further, the isolation of the poly-$\beta$-alanine compound (I) from a mixture of the poly-$\beta$-alanine compounds (I) and (II) may be effected by putting the mixture into a suitable solvent to dissolve the poly-$\beta$-alanine compound (I) and withdrawing the resulting solution of the poly-$\beta$-alanine compound (I). On the other hand, the isolation of the poly-$\beta$-alanine compound (II) from a mixture of the poly-$\beta$-alanine compounds (I) and (II) may be effected by putting the mixture into a suitable solvent to dissolve the poly-$\beta$-alanine compound (I) and withdrawing the undissolved portion. As the suitable solvent for the poly-$\beta$-alanine compound (I), there may be mentioned formic acid, water and the like.

In still a further aspect of the present invention, there is provided a polyacetal resin composition comprising:

60 to 99.99% by weight, based on the composition, of a polyacetal resin; and 0.01 to 3% by weight, based on the composition, of at least one compound selected from the group consisting of:

a poly-$\beta$-alanine compound (I') comprising:

(X) monomeric units represented by the formula $(CH_2CH_2CONH)$ and (Y) monomeric units represented by the formula

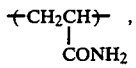

the content of said units (Y) being in the range of 1.4 to 10 mmol per gram of the compound,
wherein said compound (I') is soluble in formic acid, and
a poly-β-alanine compound (II') comprising:
(X) monomeric units represented by the formula $\{CH_2CH_2CONH\}$ and
(Y) monomeric units represented by the formula

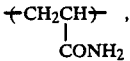

the content of said units (Y) being in the range of 1.4 to 10 mmol per gram of the compound,
wherein said compound (II') is insoluble in formic acid.

In the poly-β-alanine compounds (I') and (II') of the present invention, the content of the units (Y) is in the range of 1.4 to 10 mmol, preferably 1.4 to 9.0 mmol, per gram of the compound. Even if a poly-β-alanine compound in which the content is out of this range is incorporated in a polyacetal resin, the effect of improving the thermal stability of the polyacetal resin is not exerted.

The poly-β-alanine compounds (I') and (II') are fundamentally different from a mere mixture of poly-β-alanine and polyacrylamide. In fact, even if a mixture of poly-β-alanine and polyacrylamide is incorporated into a polyacetal resin, the effects of improving the thermal stability of the resin without causing heat discoloration of the resin are not exerted.

The poly-β-alanine compound (I') is desired to have a reduced viscosity ($\eta$sp/C) of 0.5 to 15 dl/g, preferably 1 to 10 dl/g, more preferably 2 to 5 dl/g as measured at 35° C. with respect to 1% (w/v) solution of the compound in formic acid. The compound (I') may be prepared in substantially the same manner as explained with respect to the preparation of a compound (I). The desired degree of reduced viscosity can be obtained by appropriately controlling the reaction temperature, reaction time, etc. in the polymerization of acrylamide using an alkaline earth metal alcoholate in an amount within the abovementioned range. The compound (II') may also be prepared in substantially the same manner as explained with respect to the preparation of a compound (II).

The content of the polyacetal resin in the present polyacetal resin composition is 60 to 99.99% by weight based on the composition.

The polyacetal resin composition of the present invention contains one or both of the poly-β-alanine compounds (I') and (II') in an amount of 0.01 to 3% by weight, preferably 0.05 to 1% by weight based on the composition. If the amount is less than 0.01% by weight based on the composition, the effect of the poly-β-alanine compound as a thermal stabilizer cannot sufficiently be exerted. The use of the poly-β-alanine compound in an amount of more than 3% by weight based on the composition is disadvantageous from an economical viewpoint.

Examples of the polyacetal resin which may be incorporated in the polyacetal resin composition of the present invention include polyoxymethylene obtained from formaldehyde or a cyclic oligomer thereof such as trioxane, and a copolymer of formaldehyde or trioxane and a cyclic ether compound. As examples of the cyclic ether compound, there may be mentioned ethylene oxide, propylene oxide, isobutylene oxide, styrene oxide and cyclohexene oxide. As the polyoxymethylene, there may advantageously be used those having a melt index of 0.01 to 70 g/10 min, preferably 0.1 to 65 g/10 min as measured at a temperature of 190° C. under a load of 2.16 Kg in accordance with a method of ASTM-D1238-57T.

The polyacetal resin composition according to the present invention may be used in the form of, for example, pellets, flakes or the like. The polyacetal resin composition of the present invention may be prepared by mixing, by customary technique, a polyacetal resin, a poly-β-alanine compound (I') and/or a poly-β-alanine compound (II') and any additives.

In the polyacetal resin composition of the present invention, various customarily employed additives may be incorporated in accordance with the use of the composition. Examples of additives include an antioxidant, an ultraviolet light absorber, a lubricant, a pigment, an inorganic filler, and the like.

Examples of an antioxidant include antioxidants of a phenol type and an amidine type, e.g., amidine compounds described in Japanese Patent Application No. Publication No. 40-21148/1965. The antioxidants of these types may be employed in an amount of 0.01 to 1% by weight based on the composition. Hindered amine type antioxidants may also be employed in an amount of 0.001 to 3% by weight based on the composition.

As an ultraviolet light absorber, there can be mentioned, for example, those of benzotriazole type, benzophenone type, oxalic acid anilide type, salicylate type, benzoate type, acrylate type and nickel type. They may be employed in an amount of 0.01 to 3% by weight based on the composition.

As a lubricant, there can be mentioned, for example, those of ether type, ester type, amide type and boric acid ester type. Aliphatic alcohols having 12 to 22 carbon atoms may also be used as a lubricant. Lubricants described in Japanese Patent Application Laid-Open Specification. No. 61-123652/1986 may also be used. They may be employed in an amount of 0.01 to 7% by weight based on the composition.

As a pigment, there can be mentioned, for example, inorganic pigments such as metal powder, oxides, sulfides, chromate, etc. of Al, Ti, Cr, Fe, Co. There can also be mentioned pigments of perillen type, anthraquinone type, indigo type, dioxane type, quinacridone type, monoazo type, diazo type, polyazo type, phthalocyanine type, isoindolenone type, and quinophthalone type. Carbon black may also be used.

Examples of an inorganic filler include those which are described in Japanese Patent Application Laid-Open specification No. 60-22846/1985.

As compared with the conventional polyacetal compositions in which a polyamide formed by condensation polymerization is corporated, the polyacetal resin composition of the present invention is excellent in thermal stability, even when additives such as pigment and carbon black are incorporated in the composition, and in resistance against heat discoloration. Therefore, the polyacetal resin composition of the present invention can be suitably used as a molding composition in various applications.

The reason why the poly-β-alanine compounds (I′) and (II′) bring about such excellent effects as a thermal stabilizer for a polyacetal resin as mentioned above has not been elucidated. However, the resin is presumed to reside in that the present poly-β-alanine compounds have the units (Y) and the units (X) and that the terminal groups of the poly-β-alanine compounds are different from the terminal groups of the polyamides formed by condensation polymerization which are conventionally used as a thermal stabilizer for a polyacetal resin. The terminal groups of the polyamides which are conventionally used are —NH$_2$ and —COOH and have an adverse effect on the thermal stability and discoloration of the polyacetal resin, whereas the terminal groups of the poly-β-alanine compounds (I′) and (II′) are —CONH$_2$, —CH=CH$_2$ and ROCH$_2$CH$_2$— (wherein R is an alkyl group). It is believed that such specific terminal groups of the poly-β-alanine compounds do not have adverse effects on the thermal stability and discoloration of a polyacetal resin.

The present invention will now be described in more detail with reference to the following Examples that by no means limit the scope of the invention.

In the following Examples and Comparative Examples, the properties of polymers and polymer blends were determined according to the following methods.

(1) Determination of Reduced Viscosity 5 g of a polymer is added to 100 ml of formic acid and the resulting mixture is stirred at room temperature for 2 hours to dissolve the polymer. The resultant solution is subjected to filtration under reduced pressure to obtain a solution. To the thus obtained solution is added 500 ml of methanol to precipitate the polymer dissolved in the solution. The precipitated polymer is dried under reduced pressure at 80° C. for 10 hours by means of a vacuum dryer to obtain a polymer sample. The thus obtained polymer sample is dissolved at 25° C. in 100 ml of formic acid or an at least 99% by weight aqueous solution of formic acid, to obtain a sample solution having a concentration (c) of 1 g/dl. The obtained sample solution is subjected to a measurement of reduced viscosity using Ostwald viscometer conducted in a bath maintained at 35° C.. The reduced viscosity ($\eta_{sp}/c$) is calculated according to the following formula.

$$\eta_{sp}/c \ (dl/g) = \left(\frac{t}{t_0} - 1\right)/c$$

wherein t is the time (sec) taken for the sample solution to drop and $t_0$ is the time (sec) taken for formic acid or the above-mentioned formic acid solution to drop.

(2) Determination of Content of Units (Y)

0.71 g of a polymer sample and 50 ml of a 40% by weight aqueous solution of potassium hydroxide are charged in a flask provided with a stirrer and a condenser. Separately, 60 ml of 0.1N H$_2$SO$_4$ is put into another flask and the end of the condenser is immersed in the H$_2$SO$_4$. The polymer sample and potassium hydroxide solution in the flask is heated at a temperature of 110° to 115° C. for 20 min while stirring, thereby hydrolyzing the primary amide groups to form ammonia. After cooling of the liquid in the flask to room temperature, 50 ml of methanol is added to the liquid, followed by heating so that the temperature of the liquid in the flask becomes 95° C. in about 60 min, thereby casuing the methanol together with the ammonia to be distilled out. The distillate is condensed and introduced into the H$_2$SO$_4$. The thus obtained solution is subjected to titration with 0.1 N NaOH using methyl red as an indicator, to determine the amount of ammonia. The content of the units (Y) is calculated according to the following formula $$C(Y) \ (mmol \ per \ gram) = (V_0 - V) \times 0.1/0.71$$

wherein C(Y) is the content of the monomeric units (Y), $V_0$ is the original volume (ml) of 0.1 N H$_2$SO$_4$ and V is the titration volume (ml) of 0.1 N NaOH. (3) Thermal Stability Test The thermal stability of a polymer is evaluated in terms of the weight loss (%) on heating at a temperature of 250° C. for a period of 15 min. The weight loss of about 50 mg of a sample polymer is measured under a stream of gaseous nitrogen by the use of a thermogravimetry/differential thermal analyzer (TG/DTA) (model SCC-560 GH manufactured and sold by Sieko Instruments Inc., Tokyo, Japan).

(4) Discoloration Test

A sample polymer is heated in the cylinder of a 1-ounce injection molding machine at a temperature of 230° C. for a period of 20 min, and then is injected into a molding die to obtain a test specimen. The color of the test specimen is observed, and is classified into one of the following criteria.

| Criteria | Color |
|---|---|
| A | white |
| B | yellow |
| C | light yellowish brown |
| D | light brown |
| E | brown |

(5) Adhesion Test

With respect to a polymer film formed on a glass plate by applying a polymer solution thereonto followed by removal of the solvent of the solution, the adhesion property of the film to the glass plate is measured as follows. First, a grid pattern of 1 mm by 1 mm squares is cut on the film by the use of a sharp edged cutter knife in a manner such that the edge of hte knife reaches the surface of the glass plate through the whole thickness of the film. Next, a cellophane adhesive tape having a width of 15 mm is applied to the film so that the adhesive side of the tape adheres to the surface of the film remote from the glass plate. Then, the tape is rapidly peeled off with fingers to evaluate the adhesion property of the film to the glass plate.

EXAMPLE 1

Into a 2-liter reaction vessel provided with a stirrer are charged 1.6 liters of xylene as a solvent and 0.178 g (1/10,000 mole relative to 1 mole of acrylamide) of calcium n-propylate as a catalyst. The catalyst is well dispersed in the solvent, and 800 g of acrylamide is added to the dispersion. The mixture is stirred under a stream of gaseous nitrogen at a temperature of 90° C. for a period of 4 hr to effect polymerization reaction of the acrylamide. Separation of a polymerization product from the solution occurred with the progress of the polymerization reaction. After completion of the polymerization reaction, the mixture is allowed to stand undisturbed and subjected to filtration with a glass filter. The thus filtered-off polymerization product is pulverized by the use of a blade-equipped high speed rotation pulverizer to obtain a powdery product having an average particle diameter of 0.5 mm or less. The powdery product is washed with acetone, and dried under a reduced pressure of about 5 Torr at a temperature of 70° C. for a period of 24 hr. The amount of the thus dried product is 769 g (yield 96.1%).

The dried product is subjected to the IR spectrophotometry (KBr method) with a method J1R-100 IR spectrophotometer manufactured and sold by Nippon Denshi K.K. Japan. The IR spectrum of the product showed the following absorption bands characteristic of amide groups, as illustrated in FIG. 1.

| $cm^{-1}$ | Group |
|---|---|
| 3290 | Secondary amide (—CONH—) |
| 1638 | " |
| 1535 | " |
| 1108 | " |
| 972 | " |
| 3355 | Primary amide (—CONH$_2$) |
| 3190 | " |
| 1658 | " |
| 1617 | " |

Further, the dried product is subjected to $^{13}$C-NMR spectrum measurement with a model JNN-GX270 NMR spectrometer manufactured and sold by Nippon Denshi K.K., Japan, The $^{13}$C-NMR spectrum of the product showed the following signals, which are assigned to the following groups, as illustrated in FIG. 2.

| Chemical shift (ppm) | Group |
|---|---|
| 35–39 | Carbon of methylene group of —(CH$_2$CH$_2$CONH)— and 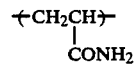 |
| 42.5 | Tertiary carbon of 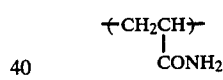 |
| 176–180 | Carbon of carbonyl group of —(CH$_2$CH$_2$CONH)— and  |

From the study of IR and NMR spectra, it is confirmed that the product is a polymer comprised, in a random distribution, of monomeric units (X) of the formula ―(CH$_2$CH$_2$CONH)― and monomeric units (Y) of the formula

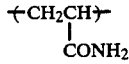

The content of the units (Y) in the polymer is 5.5 mmol per gram of the polymer and the polymer has a reduced viscosity of 2.3 dl/g at 35° C. The product is decomposed at about 330° C. The calcium content of the product is 53 ppm.

The product has a film-forming property. That is, by dissolving the product in hot water, casting the resulting aqueous solution of a Teflon ® (registered trade mark of E.I. Du Pont) plate so that the solution formed a layer of about 1 mm in thickness on the surface of the plate, and drying the layer in a heated air oven at a temperature of about 120° C., there is obtained a film.

EXAMPLE 2 TO 5

Substantially the same procedures as described in Example 1 are repeated, except that the kind of catalyst, molar ratio of catalyst to acrylamide, reaction temperature and reaction time were changed as indicated in Table 2. The content of the units (Y) in the product (mmol per gram) and yield of the thus obtained product are indicated in Table 2. By the study of the IR and NMR spectra taken with respect to the product, it is confirmed that the product is comprised, in a random distribution, of monomeric units (X) of the formula ―(CH$_2$CH$_2$CONH)― and monomeric units (Y) of the formula

TABLE 2

| Example | Kind of catalyst | Molar Ratio of catalyst to acrylamide | Reaction temp. & Reaction time | Reduced Viscosity (dl/g) | Content of Units (Y) (mmol per gram) | Yield (%) |
|---|---|---|---|---|---|---|
| 2 | Calcium n-propylate | 1/20,000 | 80° C. 4 hr | 3.13 | 6.93 | 97.4 |
| 3 | Calcium ethylate | 1/5,000 | 100° C. 6 hr | 2.10 | 4.94 | 96.2 |
| 4 | Magnesium t-butoxide | 1/30,000 | 80° C. 4 hr | 4.08 | 7.69 | 96.8 |
| 5 | Calcium n-propylate | 1/500 | 90° C. 4 hr | 2.84 | 1.80 | 98.3 |

Comparative Example 1

Substantially the same procedures as described in Example 1 are repeated except that the catalyst is added in an amount of such that the molar ratio of catalyst to acrylamide is 1/30. The product has a reduced viscosity of 1.4 dl/g. The content of the units (Y) in the product is 0.4 mmol per gram of the product. The amount of the dried product is 785.6 g (yield 98.2%).

The product had not a film-forming property. That is, even by dissolving the product in hot water, casting the resulting aqueous solution on a Teflon ® plate so that the solution formed a layer of about 1 mm in thickness on the surface of the plate, and drying the layer in a heated air oven at a temperature of about 120° C., there could not be obtained a film.

EXAMPLE 6

Substantially the same procedures as described in Example 1 are repeated except that the polymerization reaction of acrylamide is conducted at 90° C. for 4 hours and further at 120° C. for 4 hours. The resulting product has a reduced viscosity of 13.8 dl/g. The product contained a substance which is insoluble in formic acid. The content of the units (Y) in the polymer is 6.06 mmol per gram of the polymer.

EXAMPLE 7

Polymerization of acrylamide was conducted in a double tube apparatus comprised of a stainless steel inside tube having an inside diameter of 1.0 cm, an outside diameter of 1.3 cm and a length of 30 cm and a stainless steel outside tube having an inside diameter of 3.0 cm, an outside diameter of 3.5 cm and a length of 30 cm, in which apparatus silicone oil as a heating medium is circulated through a space formed by the outside surface of the inside tube and the inside surface of the outside tube. In operation, 20 g of acrylamide as a monomer and 0.0044 g (1/10,000 mole relative to 1 mole of the monomer) of calcium dipropoxide as a catalyst are uniformly mixed, and the resulting mixture is charged into the inside tube of the apparatus. The inside tube was evacuated using a vacuum pump to about 60 Torr, and gaseous nitrogen is introduced into the inside tube to about 760 Torr. The monomer in the inside tube is completely melted by circulating the silicone oil heated at 90° C. through the space formed by the outside surface of the inside tube and the inside surface of the outside tube. Then, the temperature of the circulating silicone oil as a heating medium is elevated to 100° C. and maintained for 1.5 hr, further elevated to 110° C. and maintained for 1.5 hr, still further elevated to 120° C. and maintained for 1.5 hr, still further elevated to 130° C. and maintained for 1.5 hr, and finally elevated to 170° C. and maintained for 3 hr. Thereafter, the reaction system is cooled to room temperature. Then, a rod-form polymer is taken out from the stainless steel inside tube. The rodform form polymer is washed with acetone to remove the unreacted monomer and dried under a reduced pressure of about 5 Torr at a temperature of 70° C. for a period of 24 hr. The conversion as defined by the formula $$\frac{\text{weight of charged monomer} - \text{weight of unreacted monomer}}{\text{weight of charged monomer}} \times 100$$

is 98%. The content of the units (Y) in the polymer is 6.41 mmol per gram of the polymer. Of the obtained polymer, 60% is soluble in formic acid and 40% is insoluble therein. The reduced viscosity of the formic acid soluble portion of the polymer is 6.1 dl/g.

EXAMPLE 8

100 Parts by weight of a powdery polyoxymethylene resin (having a melt index of 15.4 g/10 min as measured at a temperature of 190° C. under a load of 2.16 kg in accordance with ASTM-D1238-57T) whose molecular terminals are acetylated, 0.25 part by weight of 2,2'-methylenebis(4-methyl-6-t-butylphenol) as an antioxidant and 0.5 part by weight of each of the poly-$\beta$-alanine compounds prepared in Examples 1 to 7 are blended in a Henschel mixer. The thus obtained blend are pelletized using an extruder at a temperature of 200° C. The resultant pellets are dried by heated air at a temperature of 80° C. for a period of 14 hr. The dried pellets are subjected to thermal stability and discoloration tests, and the results are shown in Table 3.

Comparative Example 2

Substantially the same procedures as described in Example 8 are repeated except that a terpolymer of 35% of hexamethylene adipamide, 27% of hexamethylene sebacamide and 38% of caprolactam, which is disclosed in Japanese Patent Application Publication No. 34-5440, is employed in place of the poly-$\beta$-alanine compounds having a primary amide group. The results are shown in Table 3.

Comparative Example 3

Substantially the same procedures as described in Example 8 are repeated except that a mixture comprised of a copolymer of ethylene and methyl acrylate and dispersed in the copolymer, polyhexamethylene adipoamide, which is disclosed in Japanese Patent Application Laid-Open Specification No. 53-78255 is employed in place of the poly-$\beta$-alanine compounds, and that the mixture is added in an amount of 0.5 part by weight in terms of the amount of the polyamide unit of the mixture. The results are shown in Table 3.

TABLE 3

|  | Stabilizer | Thermal stability, weight loss (%) | Discoloration |
|---|---|---|---|
| Example 8 | Polymer of Example 1 | 0.19 | A |
| " | Polymer of Example 2 | 0.21 | A |
| " | Polymer of Example 3 | 0.23 | A |
| " | Polymer of Example 4 | 0.35 | A |
| " | Polymer of Example 5 | 0.36 | A |
| " | Polymer of Example 6 | 0.17 | A |
| " | Polymer of Example 7 | 0.15 | A |
| Comparative Example 2 |  | 0.43 | C |
| Comparative Example 3 |  | 0.55 | C |

EXAMPLE 9

100 Parts by weight of the same powdery polyoxymethylene resin as employed in Example 8, 0.25 part by weight of 2,2'-methylenebis(4-methyl-6-t-buthylphenol) as an antioxidant, 0.5 part by weight of each of the poly-$\beta$-alanine compounds synthesized in Examples 1 and 2 and 0.2 part by weight of a carbon black or 0.2 part by weight of titanium oxide as an additive are blended in a Henschel mixer. The thus obtained blend is pelletized using an extruder at a temperature of 200° C. The resultant pellets are dried by hot air at a temperature of 80° C. for a period of 14 hours. The dried pellets are subjected to the thermal stability test, and the results are shown in Table 4.

Comparative Example 4

Substantially the same procedures as described in Example 9 are repeated except that the terpolymer as employed in Comparative Example 2 was employed in place of the poly-β-alanine compounds. The results are shown in Table 4.

Comparative Example 5

Substantially the same procedures as described in Example 9 are repeated except that the mixture as employed in Comparative Example 3 is employed in place of the poly-β-alanine compounds. The results are shown in Table 4.

TABLE 4

|  | Stabilizer | Thermal stability, weight loss (%) | |
|---|---|---|---|
|  |  | Carbon black | titanium oxide |
| Example 9 | Polymer of Example 1 | 1.17 | 0.35 |
| " | Polymer of Example 2 | 1.40 | 0.43 |
| Comparative Example 4 | Terpolymer of Comparative Example 2 | 2.00 | 0.73 |
| Comparative Example 5 | Mixture of Comparative Example 3 | 2.02 | 0.88 |

EXAMPLE 10

The product of Example 1 is dissolved in hot water, cast on a glass plate, and dried. Thus, a film is formed on the glass plate. The adhesion of the film to the glass plate is investigated by the adhesion test as described hereinbefore. In the adhesion test, release of the film from the glass plate did not occur, which showed an excellent adhesion property of the product.

EXAMPLE 11

200 Grams of a water containing 1,000 ppm of the poly-β-alanine compound of Example 1 is added to 10 g of a clay soil. The resulting mixture is stirred well, and then is filtered by the use of a glass filter. The filtration rate is 0.09 m³/m² hr.

Comparative Example 6

200 Grams of water is added to 10 g of the same kind of clay soil as employed in Example 11. The resulting mixture is stirred well, and then is filtered by the use of a glass filter. The filtration rate is 0.03 m³/m² hr, which is only 1/3 of the rate exhibited in Example 11. This showed the soil aggregation effect of the poly-β-alanine compound.

EXMAPLE 12

10 Volumes of formic acid is added to 1 volume of the polymer which is obtained in Example 7. The resulting mixture is stirred and filtered to obtain a formic acid soluble substance and a formic acid insoluble substance separately. The formic acid insoluble substance is dried under vacuum at 100° C.. The infrared absorption spectrum of the formic acid insoluble substance is shown in FIG. 3. It is confirmed by the infrared absorption spectrum in FIG. 3 that the formic acid insoluble substance contained monomeric units (X) of the formula $CH_2CH_2CH$ and monomeric units (Y) of the formula

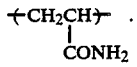

Further, as a result of the quantative determination through alkali hydrolysis, the content of the units (Y) in the substance is found to be 6.06 mmol per gram of the substance.

The formic acid insoluble substance is blended into the polyacetal resin according to the procedures as described in Example 8. The thermal stability and discoloration of the resulting blend are determined. As a result, it is found that the weight loss on heating is 0.22% only and that the discoloration criterion is A. From these, it is apparent that the formic acid insoluble substance is an excellent thermal stabilizer for the polyacetal resin.

The formic acid insoluble substance and the formic acid soluble compound are each subjected to a differential thermal analysis using a model DSC-2 analyzer manufactured and sold by Perkin Elmer Co., Ltd. U.S.A., in which analysis a sample of 5 mg in weight is heated from 40° C. to 400° C. at a temperature elevation rate of 20° C./min. Their thermograms are shown in FIGS. 4 and 5.

EXAMPLE 13

A powdery polyoxymethylene copolymer resin containing 2% by weight of $-CH_2-CH_2-O-$ group (having a melt index of 9.0 g/10 min as measured at a temperature of 190° C. under a load of 2.16 kg in accordance with ASTM-D1238-57T), 0.25% by weight, based on the total, of IRGANOX 1010 (trade name of a phenol type antioxidant produced and sold by CHIBA GEIGY, Switzerland), 0.5% by weight, based on the total, of the poly-β-alanine compound prepared in Example 7, and 0.1% by weight, based on the total, of melamine are blended in a Henschel mixer. The thus obtained blend is pelletized using an extruder at a temperature of 200° C.. The resultant pellets are dried by heated air at a temperature of 80° C. for a period of 14 hr. The dried pellets are subjected to thermal stability tests, and the results are shown in Table 5.

Comparative Example 7

Substantially the same procedures as in Example 13 are repeated except that the use of the poly-β-alanine compound is omitted, to obtain pellets. Substantially the same tests as in Example 13 are conducted, and the test resutls are also shown in Table 5.

TABLE 5

| | Poly-β-alanine compound, wt % based on the total | Additives, wt % based on the total | | Thermal stability, weight loss (%) | Thermal aging resistance at 140° C. in terms of tensile yield strength (Kg/cm²)* | | | |
|---|---|---|---|---|---|---|---|---|
| | | Melamine | IRGANOX 1010 | | 0 (hr) | 1000 (hr) | 2000 (hr) | 3000 (hr) |
| Example 13 | 0.5 | 0.1 | 0.25 | 0.05 | 620 | 645 | 502 | 403 |
| Comparative Example 7 | — | 0.1 | 0.25 | 0.13 | 620 | 492 | 360 | 124 |

*Note: The test conditions for measuring tensile yield strength were in accordance with ASTM 638.

EXAMPLE 14

A powdery polyoxymethylene copolymer resin containing 2% by weight of —$CH_2$—$CH_2O$— group (having a melt index of 9.0 g/10 min as measured at a temperature of 190° C. under a load of 2.16 kg in accordance with ASTM-D1238-57T), additives indicated in Table 6, and 0.5% by weight, based on the total, of the poly-$\beta$-alanine compound prepared in Example 7 are blended in a Henschel mixer. The thus obtained blend is pelletized using an extruder at a temperature of 200° C.. The resultant pellets were dried by heated air at a temperature of 80° C. for a period of 14 hr. The dried pellets are subjected to thermal stability test, and the results are shown in Table 6.

Comparative Example 8

Substantially the same procedures as in Example 14 are repeated except that the use of the poly-$\beta$-alanine compound is omitted, to obtain pellets. Substantially the same tests as in Example 14 are conducted, and the test resutls are also shown in Table 6.

TABLE 6

| | Poly-$\beta$ alanine compound, wt % based on the total | Additives, wt % based on the total | | | Weathering*1 test results |
| --- | --- | --- | --- | --- | --- |
| | | IRGANOX 1010 | Tinuvin*2 320 | CHIMA*3 SSORB 944 LD | Crack initiation time (hr) |
| Example 14 | 0.5 | 0.25 | 0.5 | 0.2 | 1,000 |
| Comparative Example 8 | — | 0.25 | 0.5 | 0.2 | 600 |

Note:
*1 The weathering test was conducted at 63° C. under wet condition using "Sunshine" weatherometer of WEL-SUN-HCH-B type produced and sold by Suga Company, Japan.
*2 Trade name of an ultraviolet light absorber produced and sold by CIBA GEIGY, Switzerland.
*3 Trade name of a hindered amine type anti-oxidant produced and sold by CIBA GEIGY, Switzerland.

What is claimed is:

1. A polyacetal resin composition comprising:
60 to 99.99% by weight, based on the composition, of a polyacetal resin; and
0.01 to 3% by weight, based on the composition, of a poly-$\beta$-alanine comprising:
(X) monomeric units represent by the formula —$(CH_2CH_2CONH)$— and
(Y) monomeric units represented by the formula

the content of said units (Y) being in the range of 1.4 to 10 mmol per gram of the poly-$\beta$-alanine.

2. The polyacetal resin composition according to claim 1, wherein said poly-$\beta$-alanine has a reduced viscosity ($\eta sp/^C$) of 0.5 to 15 dl/g as measured at 35° C. with respect to 1% (w/v) solution of the poly-$\beta$-alanine in formic acid.

3. The polyacetal resin composition according to claim 2, wherein the content of said units (Y) is in the range of 1.4 to 9.0 mmol per gram of the poly-$\beta$-alanine.

4. The polyacetal resin composition according to claim 1, wherein the weight of the poly-$\beta$-alanine is 0.05 to 1% by weight.

* * * * *